(12) United States Patent
Strong

(10) Patent No.: US 8,905,478 B2
(45) Date of Patent: Dec. 9, 2014

(54) CHILD SAFETY SEAT WITH STRUCTURAL SUPPORT

(75) Inventor: L. Curtis Strong, Rock Hill, SC (US)

(73) Assignee: Britax Child Safety, Inc., Charlotte, NC (US)

( * ) Notice: Subject to any disclaimer, the term of this patent is extended or adjusted under 35 U.S.C. 154(b) by 182 days.

(21) Appl. No.: 12/725,968

(22) Filed: Mar. 17, 2010

(65) Prior Publication Data
US 2011/0227383 A1   Sep. 22, 2011

(51) Int. Cl.
*A47C 1/08* (2006.01)

(52) U.S. Cl.
USPC ............. 297/256.14; 297/250.1; 297/253; 297/254; 297/256.1

(58) Field of Classification Search
CPC ..... B60N 2/2806; B60N 2/286; B60N 2/2863
USPC ............ 297/250.1, 253, 254, 256.1, 256.14
See application file for complete search history.

(56) References Cited

U.S. PATENT DOCUMENTS

| | | | |
|---|---|---|---|
| 2,270,172 A | 1/1942 | Ruegger | |
| 3,326,603 A | 6/1967 | Lehner | |
| 3,985,388 A | 10/1976 | Hogan | |
| 3,998,291 A | 12/1976 | Davis | |
| 4,033,622 A | 7/1977 | Boudreau | |
| 4,348,048 A * | 9/1982 | Thevenot | 297/256.13 |
| 4,480,780 A * | 11/1984 | Claeskens et al. | 228/180.21 |
| 4,662,597 A | 5/1987 | Uecker et al. | |
| 4,826,246 A | 5/1989 | Meeker | |
| 5,286,085 A | 2/1994 | Minami | |
| 5,460,427 A | 10/1995 | Serber | |
| 5,462,333 A | 10/1995 | Beauvais | |
| 5,466,044 A * | 11/1995 | Barley et al. | 297/252 |
| 5,468,045 A | 11/1995 | Weber | |
| 5,524,965 A * | 6/1996 | Barley | 297/256.16 |
| 5,551,751 A | 9/1996 | Sedlack et al. | |
| 5,609,393 A | 3/1997 | Meeker et al. | |
| 5,639,144 A | 6/1997 | Naujokas | |

(Continued)

FOREIGN PATENT DOCUMENTS

| | | |
|---|---|---|
| DE | 34 22 695 A1 | 12/1985 |
| DE | 19604094 A1 | 7/1997 |

(Continued)

OTHER PUBLICATIONS

European Search Report for Application No. EP 11 00 1950 dated Jul. 6, 2011.

(Continued)

*Primary Examiner* — Laurie Cranmer
(74) *Attorney, Agent, or Firm* — Alston & Bird LLP

(57) ABSTRACT

A safety seat configured for installation in a vehicle may include a seat shell that includes a bottom, a back, and first and second sides. The safety seat may also include a seat support configured to extend at least partially adjacent to the first side of the seat shell. A second seat support may extend at least partially adjacent to the second side. The bottom of the safety seat may be located between the seat supports. The safety seat may include attachment straps that are each attached at a first end to a fixed location within the vehicle and attached at a second end to a bend of the seat support that is configured to define an attachment point.

19 Claims, 11 Drawing Sheets

(56) References Cited

U.S. PATENT DOCUMENTS

| | | |
|---|---|---|
| 5,664,830 A | 9/1997 | Garcia et al. |
| 5,685,603 A | 11/1997 | Lane, Jr. |
| 5,695,243 A | 12/1997 | Anthony et al. |
| 5,722,719 A | 3/1998 | Glomstad |
| 6,267,441 B1 * | 7/2001 | Otero ................ 297/254 |
| 6,450,576 B1 * | 9/2002 | Rhein et al. ............ 297/250.1 |
| 6,517,154 B2 * | 2/2003 | Sawamoto ............ 297/216.11 |
| 6,592,183 B2 * | 7/2003 | Kain .................... 297/253 |
| 6,623,075 B2 | 9/2003 | Baloga et al. |
| 6,669,288 B2 | 12/2003 | Nakagawa et al. |
| 6,719,369 B1 | 4/2004 | Wagner |
| 6,739,659 B2 | 5/2004 | Dukes |
| 6,739,660 B2 | 5/2004 | Dukes |
| 6,752,455 B2 | 6/2004 | Teufel et al. |
| 6,767,057 B2 * | 7/2004 | Neelis ................ 297/253 |
| 6,776,454 B1 | 8/2004 | Aubert et al. |
| 6,796,610 B2 * | 9/2004 | Nakagawa et al. ...... 297/256.16 |
| 6,869,141 B2 * | 3/2005 | Yamaoka et al. ........... 297/253 |
| 7,021,709 B2 * | 4/2006 | Dolan et al. ............ 297/253 |
| 7,219,958 B2 | 5/2007 | Yamazaki et al. |
| 7,246,853 B2 * | 7/2007 | Harcourt et al. ......... 297/250.1 |
| 7,246,854 B2 * | 7/2007 | Dingman et al. ........ 297/250.1 |
| 7,322,648 B2 * | 1/2008 | Nakagawa et al. ...... 297/250.1 |
| 7,472,952 B2 | 1/2009 | Nakhia et al. |
| 2002/0113470 A1 | 8/2002 | Kain |
| 2004/0051356 A1 * | 3/2004 | Neelis ................ 297/253 |
| 2005/0264065 A1 | 12/2005 | Clement et al. |
| 2007/0080568 A1 * | 4/2007 | Nakagawa et al. .......... 297/253 |
| 2007/0216203 A1 | 9/2007 | Rajasingham |
| 2008/0277984 A1 | 11/2008 | Carine |
| 2008/0303321 A1 | 12/2008 | Powell |
| 2008/0315647 A1 | 12/2008 | Carine |
| 2009/0102253 A1 | 4/2009 | Forbes et al. |
| 2009/0152913 A1 | 6/2009 | Amesar et al. |
| 2009/0212613 A1 | 8/2009 | Freeman et al. |
| 2009/0236881 A1 | 9/2009 | Freeman et al. |
| 2009/0256404 A1 | 10/2009 | Strong et al. |
| 2009/0267390 A1 | 10/2009 | Honnorat et al. |
| 2010/0259077 A1 | 10/2010 | Forbes et al. |
| 2011/0227383 A1 | 9/2011 | Strong |

FOREIGN PATENT DOCUMENTS

| | | |
|---|---|---|
| EP | 0403853 | 12/1990 |
| EP | 0 609 890 A1 | 8/1994 |
| EP | 1 209 025 A1 | 5/2002 |
| EP | 2 289 733 A1 | 3/2011 |
| JP | 3-032961 U | 1/1997 |
| WO | WO 01/38130 A1 | 5/2001 |

OTHER PUBLICATIONS

Extended European Search Report for EP Patent Application No. 11001951.0 dated May 26, 2011 (6 pages).

Office Action for Japanese Application No. 2011-058977 dated Nov. 20, 2013.

* cited by examiner

CHILD SAFETY SEAT WITH STRUCTURAL SUPPORT

TECHNOLOGICAL FIELD

The present invention relates to child safety seats used in motor vehicles and airplanes to protect children and, more particularly, to child safety seats that reduce the forces observed by the occupant of the child safety seat relative to the surrounding environment in the event of a sudden change in motion, such as an impact accident causing a rapid forward movement deceleration.

BACKGROUND

Child safety seats are designed to protect children in vehicles from the effects of impacts or other sudden changes in motion. Child safety seats, commonly referred to simply as car seats, may be used in a variety of vehicles with a variety of seating configurations. It is important for a child safety seat to securely retain an occupant and limit movement of that occupant, particularly during an impact. Another function of a child safety seat is to reduce the impact forces on an occupant of the seat to reduce the likelihood of injury.

Child safety seats are typically configured with a harness that secures the child within the seat and the seat is securely attached to a fixed location within a vehicle, such as with the international standard for attachment points for child safety seats, ISOFIX or in the U.S., LATCH (Lower Anchors and Tethers for Children) attachments. Proper installation of a child safety seat within a vehicle is necessary to achieve the maximum protection afforded by the seat. Improper installation can lead to increased risk of injury in an impact. One of the most dangerous injuries sustained during an impact, particularly for children, are head injuries. Head excursion, or the distance a head travels from a child safety seat, should be minimized to reduce the potential for serious injury from an impact. Additional injuries may also be sustained during an impact due to high forces exerted upon the body, which also are preferably minimized.

BRIEF SUMMARY

Various embodiments of the present invention are directed to child safety seats that may reduce the likelihood of injury to an occupant of the seat resulting from an impact. A safety seat may be configured for installation in a vehicle in a forward-facing and/or a rearward-facing position.

A safety seat according to example embodiments of the present invention may include a seat shell that has a bottom, a back, a first side, and a second side. The safety seat may also include a first seat support that at least partially extends adjacent to the first side of the seat shell and a second seat support that extends at least partially adjacent to the second side of the seat shell. The bottom of the seat shell may be located between the first seat support and the second seat support. The first seat support and the second seat support may each be part of a single, unitary element. The first seat support and the second seat support may be identical parts, configured such that the parts are interchangeable. The separation between the first seat support and the second seat support may be greater at a first end of the back of the seat shell that is adjacent to the bottom of the seat shell and narrower at the opposite end of the back of the seat shell. At least a portion of the bottom of the seat shell may be below the first and second seat supports when the safety seat is installed in a vehicle. The first and second seat supports may be substantially enclosed by the seat shell along a portion of their length.

Embodiments of a safety seat according to the present invention may further include first and second attachment straps. The first end of each of the first and second attachment straps may be respectively attached to each of the first and second seat supports. The second end of each of the first and second attachment straps may be respectively attached to first and second fixed locations within a vehicle. The first and second seat supports may each be configured with a first bend that defines a first desired location for attachment of the first end of each of the first and second attachment straps when the safety seat is installed in a vehicle in a forward-facing position. The seat supports may each be further be configured with a second bend that defines a second desired location for attachment of the first end of each of the first and second attachment straps when the safety seat is installed in the vehicle in a rearward-facing position. The first and second attachment straps may be configured to be shortened to secure the safety seat within the vehicle, and, as the attachment straps are each shortened, they may each be drawn into a bend in a respective one of the first and second seat supports as a result of the configuration of the first bends of the first and second seat supports.

Embodiments of a safety seat according to the present invention may further be configured to be pivotally attached to a base. The seat shell of the safety seat may be configured with an aperture through each of the first side and the second side where the apertures are arranged to receive a belt for securing the safety seat to a vehicle and where the seat supports are arranged to be engaged by the belt passing through the apertures.

A safety seat according to example embodiments of the present invention may include a seat support, a seat shell, and a seat cavity defined by the seat shell. The seat support may include a first portion, a second portion, and an intermediate portion (i.e., a portion that extends between the first and second portions). The seat shell may include a bottom, a back, a first side, and a second side. The seat cavity defined by the seat shell may be at least partially disposed between the first portion and the second portion of the seat supports. The intermediate portion of the seat support may extend across the back of the seat shell. The seat support may be configured to be attached to a first and a second fixed location within a vehicle by two attachment straps. The first portion and the second portion of the seat support may each define a bend from which a first and second attachment strap respectively extend when the safety seat is installed in a vehicle. The seat cavity may be disposed at least partially below the seat support when the safety seat is installed in a vehicle.

Embodiments of a safety seat according to the present invention may further include a base that is pivotally coupled to the seat shell and where the interface between the seat shell and the base is located between the first portion and the second portion of the seat support. The seat shell may further be configured with an aperture through each of the first side and the second side where the apertures are configured for receiving a belt for securing the safety seat to a vehicle. The first and second seat supports may engage a belt that passes through the apertures when the safety seat is secured within the vehicle.

A safety seat according to example embodiments of the present invention may include seat shell means for holding an occupant and support means for supporting the seat shell. The support means may include a first portion and a second portion. At least a portion of the seat shell means may be disposed between the first portion and the second portion of the support means. The first portion and the second portion of the seat support means may be configured with a bend that defines a desired location for attachment of a first end of each of a first and second attachment strap when the safety seat is installed in a vehicle.

BRIEF DESCRIPTION OF SEVERAL VIEWS OF THE DRAWING(S)

Reference will now be made to the accompanying drawings, which are not necessarily drawn to scale, and wherein.

DETAILED DESCRIPTION

The present invention will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms top, bottom, side, up, down, upwards, downwards, vertical, horizontal, and the like as used below do not imply a required limitation in all embodiments of the present invention but rather are used herein to help describe relative direction or orientation in the example embodiments illustrated in the figures. The drawings omit illustration of certain energy absorbing materials, padding, fabric, and other coverings to facilitate ease of visibility and understanding of features of the invention.

Various embodiments of the present invention provide a child safety seat configured for attachment to a seat in a variety of vehicles. The child safety seat may be configured for installation in a forward-facing position or in a rearward-facing position to accommodate children in the appropriate position based on the height and weight of a child, such as according to the guidelines and standards of the United States National Highway Transportation Safety Administration (NHTSA) and similar authorities in other countries.

Figure 1:
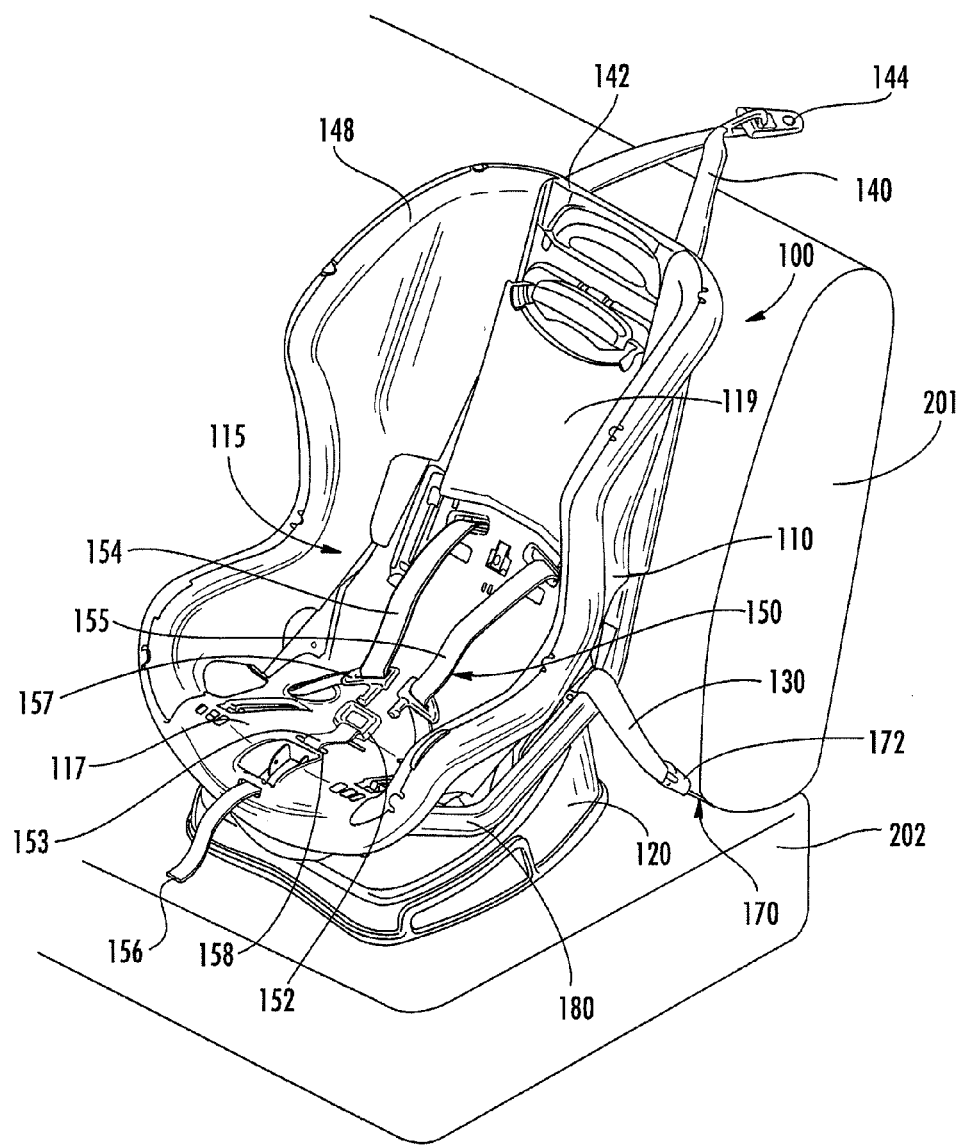
FIG. 1 is a child safety seat according to an example embodiment of the present invention as installed in a vehicle.

As illustrated in FIG. 1, the child safety seat 100 may include a seat portion 110 also referred to as a seat shell pivotably coupled to a base 120. The seat portion 110 and base 120 may pivot relative to each other, for example, to ensure a desired angle of recline for a child secured within the seat in the forward-facing or rearward-facing positions. As different vehicles have different seat configurations, the child safety seat may have an adjustable recline such that the base 120 may be situated squarely on the vehicle seat 200 while the seat portion 110 may be adjusted to a desired recline angle by pivoting on the base. Optionally, the base may be fixed to the seat portion or a unitary part of the seat portion and the base configured with an adjustment to achieve a desired angle in the installed position.

Positioning a child properly in a child safety seat is important to minimize the adverse affect an impact may have on an occupant of the child safety seat. Positioning includes the proper attachment of the safety seat to the vehicle and setting the angle of the seat portion 110 of the safety seat. Positioning the safety seat is also desirable to ensure the occupant maintains a proper seating position in the seat, such as when asleep.

The seat portion 110 may define a seating area 115 that includes a bottom 117 and a back 119. The seating area may further include a harness 150 to secure a child within the seat. The harness may include a buckle 152 and two straps 154, 155. The straps may include buckle tabs that may be secured within the buckle 152 when the harness is fastened. The straps 154, 155 may be configured to be at least indirectly coupled to an adjustment strap 156 for tightening (i.e. shortening) of the harness 150 around an occupant of the seat.

Figure 2:
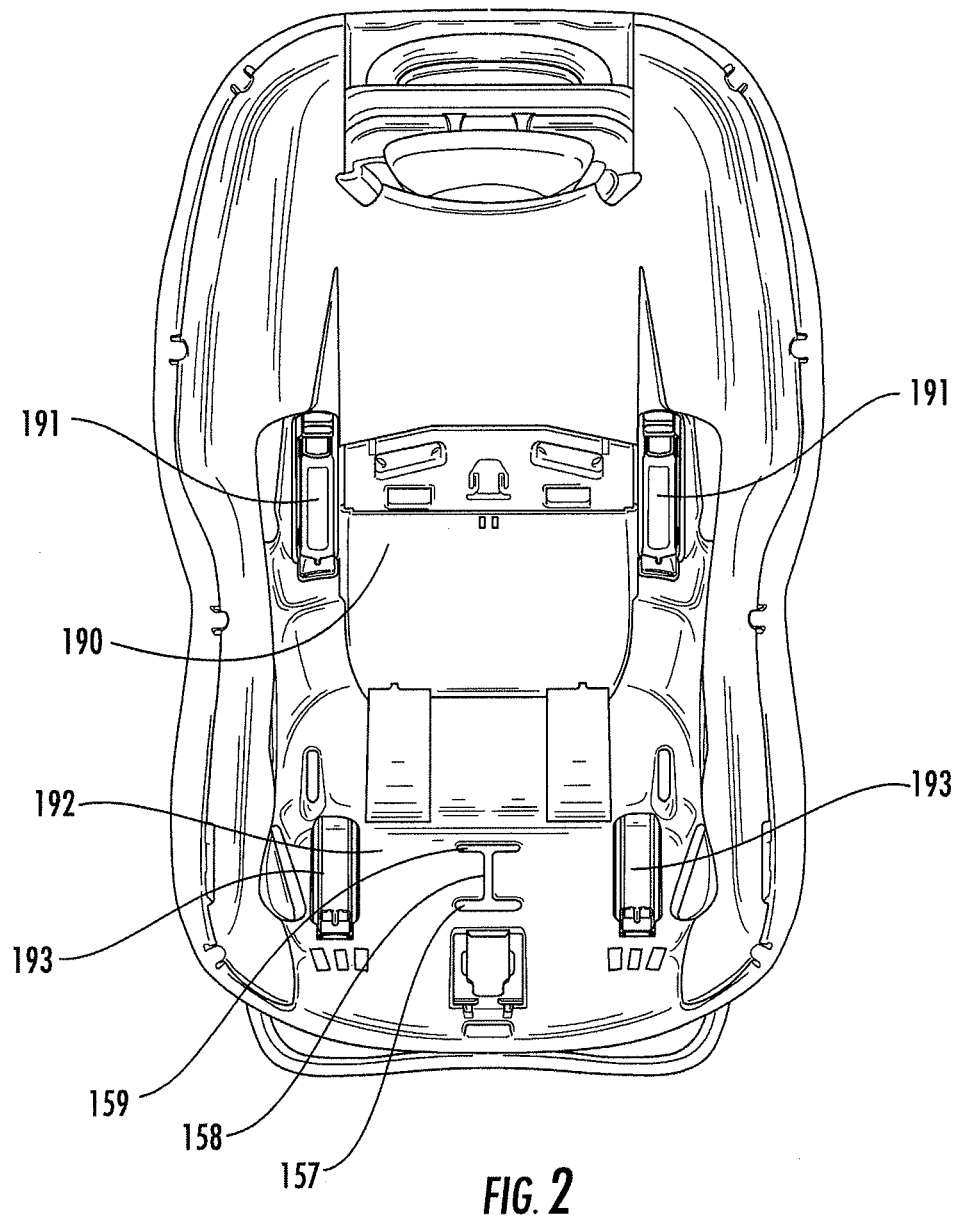
FIG. 2 is a child safety seat according to an example embodiment of the present invention as viewed from the top.

The buckle strap 153 that attaches the buckle 152 to the seat may be configured to extend from an opening 157 in the bottom 119 of the seat between the legs of an occupant of the safety seat as illustrated further in FIG. 2, which illustrates a view of the seating area 115 of the seat portion 110 as viewed from above the seat. The buckle strap 153 may be configured to be adjustable between distinct positions within the bottom 117 of the seat. The example embodiment of FIG. 2 shows that the opening 157 through which the buckle strap 153 extends in a relatively lateral configuration may also include a longitudinal repositioning portion 158 and at least a second relatively lateral opening 159. The buckle strap 153 may be made of a flexible webbing and may be adjusted by manipulating the flexible webbing from the first lateral opening 157, through the longitudinal repositioning opening 158, and into the second lateral opening 159. The adjustability of the buckle strap 153 may benefit an occupant by being positioned closer to the occupant allowing a tighter, more secure fit around the occupant. While a two-position adjustment is illustrated and described, three or more adjustable positions may be possible using similar configurations.

The safety seat may further include an energy absorbing material 148 that lines at least a portion of the seating area 115 shown in FIG. 1. The energy absorbing material 148 within the seating area 115 may be arranged to minimize the trauma sustained by an occupant of the safety seat during an impact when a body part, such as a head, shoulder, or hip, impacts the side of the seating area 115. The energy absorbing material 148 may be any known or future developed or discovered energy absorbing material such as including foam rubber (e.g. neoprene) and expanded polystyrene (EPS), or expanded polypropylene (EPP) among others. Additional energy absorbing material may be provided in regions which an occupant's head may contact during an impact.

The safety seat 100 may further include padding provided for comfort and/or safety of the occupant. Such padding may be attached to the seating area 115 of the safety seat 100 and/or the padding may be included in a cover that is provided to cover the seat 110 and provide an aesthetically pleasing exterior with colors or patterns.

The child safety seat 100 may be installed in a vehicle seat, such as by use of the vehicle seat-belt, a Lower Anchors and Tethers for Children (LATCH) system, or an ISOFix system. For example, LATCH attachment points have been standard on vehicles manufactured after Sep. 1, 2002 for sale in the U.S. and are intended to accommodate all child safety seats sold in the U.S. The LATCH attachment points typically include a metal anchor that is securely and permanently fastened to a structural member of the vehicle thereby providing a secure anchor point for attachment of the safety seat.

Figure 3:
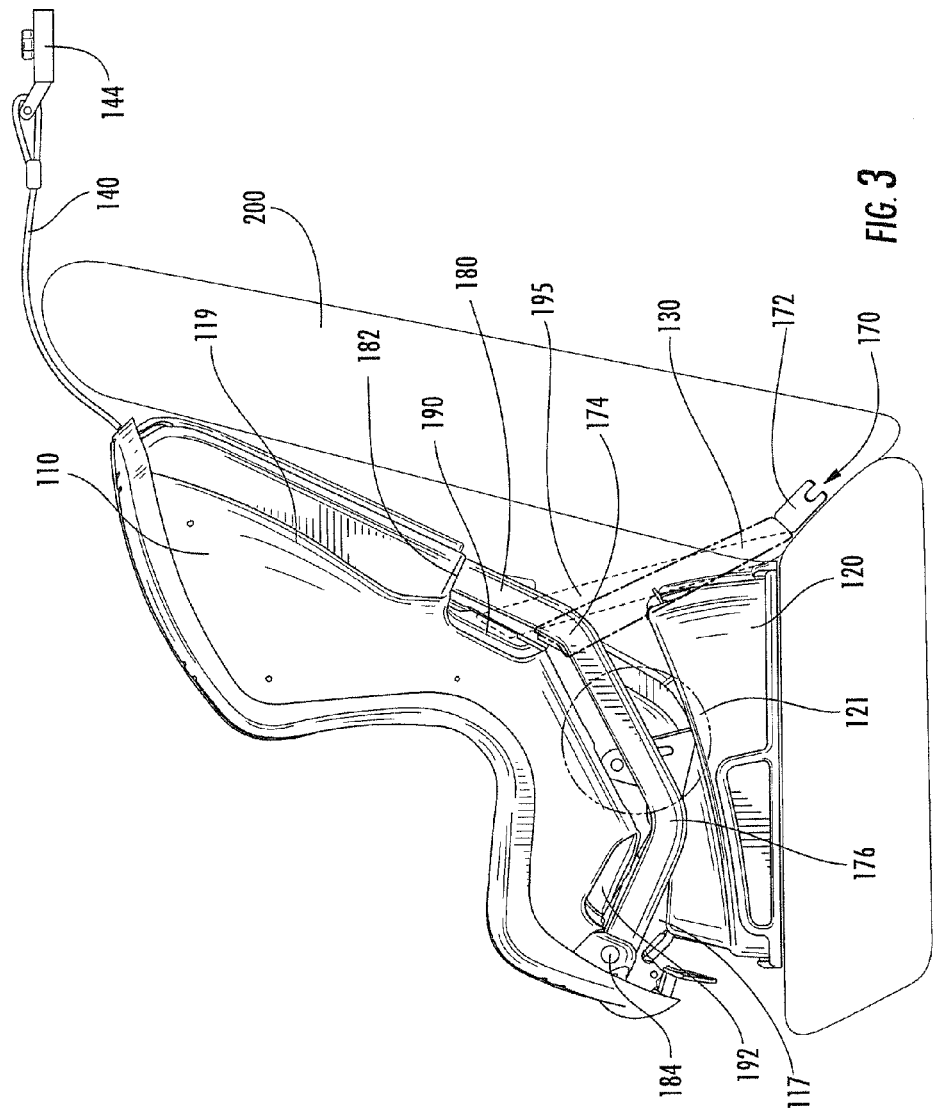
FIG. 3 is a child safety seat according to an example embodiment of the present invention as installed in a forward-facing position.
Figure 4:
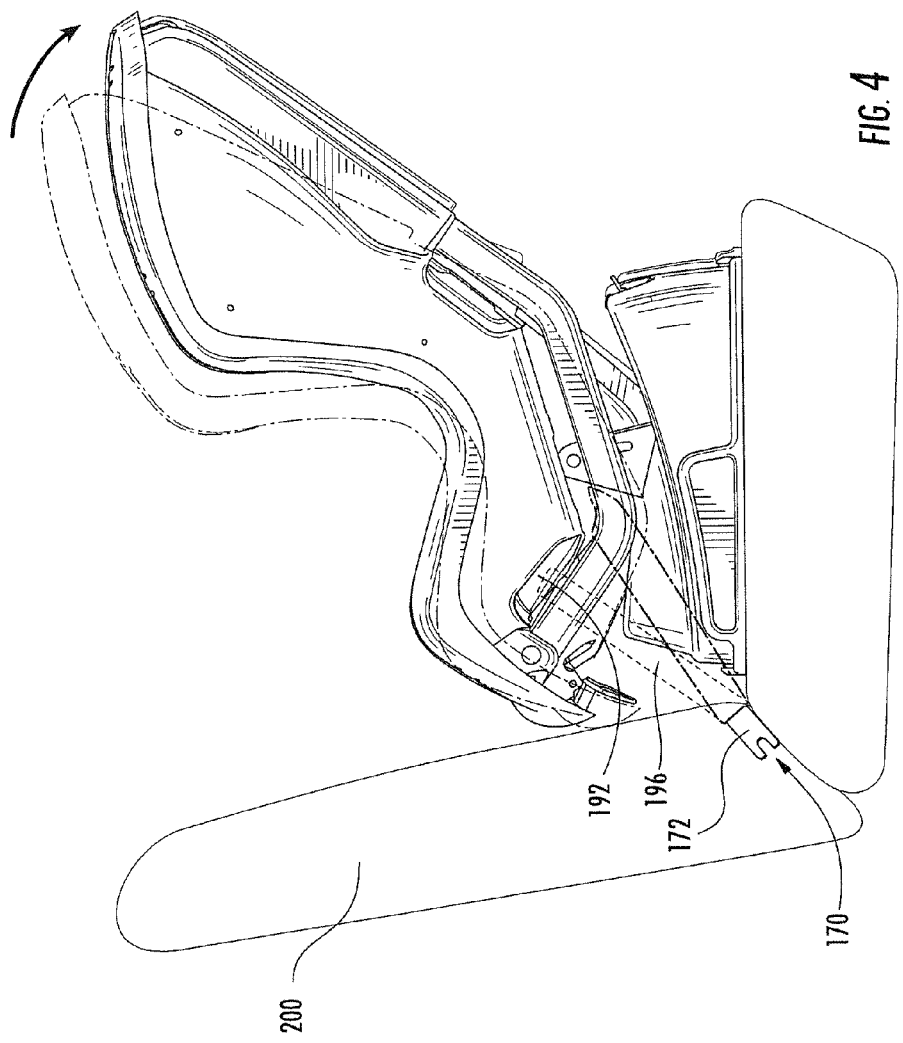
FIG. 4 is a child safety seat according to an example embodiment of the present invention as installed in a rearward-facing position.

As illustrated in the example embodiments of FIGS. 1, 3, and 4, the child safety seat is attached to the vehicle seat 200 through the use of LATCH attachment straps 130. A first end of the attachment strap 130 includes a LATCH connector 172, while a second end of the attachment strap is secured to the safety seat 100. The LATCH connector 172 may be secured to a LATCH attachment point 170 of the vehicle. Alternative means for installing the safety seat will be detailed further below. A tether 140 may be included that is secured at one end to the top-portion of the safety seat 142 and at the other end to a tether anchor 144 that is permanently secured to the vehicle as shown in FIGS. 1 and 3.

Child safety seats are frequently moved in and out of vehicles such that a low-weight safety seat may be desirable for portability while maintaining the structural rigidity necessary for safety. Further, LATCH attachment points are rated for a maximum weight such that reducing the weight of the seat may increase the permissible weight of a child that may be secured in the seat while attached to the LATCH anchors and adhering to the maximum rated weight. In view of the above, the seat portion 110 may be formed of a light-weight plastic or composite. The seat portion 110 may be made of a single piece of molded material or possibly separate pieces for the back 119 and bottom 117. The seat portion 110 may not have the necessary structural rigidity necessary for adequately securing the seat within a vehicle or for adequate protection of an occupant. Therefore, the safety seat may include additional structural support to provide added rigidity to the seat portion 110 for proper installation and adequate occupant protection. The safety seat may include a seat support 180 made of a rigid material that is attached to the seat portion 110. The seat support 180 may be a frame or portion of a frame that at least partially surrounds the seat portion 110 and provides rigidity to the seat portion and attachment points for installation within a vehicle. As defined herein and by comparison to the prior art, the seat support 180 is not solely an attachment means for installing the safety seat in a vehicle, but rather a structural element that enhances the rigidity of the seat portion 110 while also serving as a secure location for attachment to a vehicle. Seat supports according to embodiments of the present invention reduce or eliminate the need for large plastic supports that are often used in the prior art to provide structural rigidity to a safety seat and that are located behind and below the seat shell.

A side view of an example embodiment of the present invention is illustrated in FIG. 3. The side view illustrated is substantially a mirror image of the opposite side such that references herein are made to like elements on both sides of the safety seat. As shown, the seat support 180 extends at least partially adjacent each side of the seat portion 110 with the bottom 117 therebetween, as compared to extending below the bottom 117 of the seat portion as in the state of the art (i.e., between the bottom 117 and the vehicle seat). The seat support 180 may extend below the seat bottom 117; however, this may prevent the seat bottom 117 from being situated as close to the vehicle seat as desired. By virtue of the seat support extending at least partially adjacent to the sides of the seat portion 110 with the bottom 117 therebetween, the seat portion 110 may be situated lower with respect to the vehicle seat. Additionally, the seat supports 180 extending at least partially adjacent to the sides of the seat portion 110 may provide a rigid attachment point for the lower attachment straps 130.

In the illustrated embodiment of FIG. 3, the seat support 180 is securely attached to the seat portion 110 at point 184 on a first side of the seat. The seat support extends from point 184 adjacent to the bottom 117 of the seat portion 110. The seat support further extends along the back 119 of the seat portion where it may be attached to the base. The seat support 180 may be at least partially enclosed by the seat portion 110 as illustrated beginning at 182. Further, the seat support 180 may extend across the back 119 of the seat portion 110 and meet the seat support on the opposite side of the safety seat in a mirror image configuration of the seat support on the first side of the seat. The seat support may be a single, unitary element such as a single metal tube or bar that extends from point 184 adjacent to the bottom 117, along the back 119, adjacent the opposite side of the bottom 117, and terminate at a point opposite of 184. Alternatively, the seat support 180 may include two individual support members that each extend on a respective side from point 184 adjacent to the bottom 117 of the seat portion 110 and extend along the back 119 of the seat portion 110. In an example embodiment wherein the seat support 180 includes two individual support members, said support members may be identical parts constructed such that either support member could be used on either side of the safety seat. The seat support 180 of either aforementioned embodiment may extend along the back 119 of the seat portion, for example, at least as far as the top of the harness that would engage the shoulders of an occupant. Optionally, the seat support 180 may extend across the seat proximate point 184 at the front of the seat such that the support passes under the leg path of an occupant.

According to an example embodiment of the present invention wherein the seat support 180 is arranged on the side of the seat portion 110, adjacent the seat bottom 117, the seat bottom 117 may extend below the seat support as illustrated at 121. Lowering the bottom 117 of the seat helps to lower the center of gravity of the safety seat 100. Lowering the center of gravity of the seat may improve the safety seat performance during an impact as will be described further below.

The lower attachment straps 130 may be configured to attach to the seat support 180 at any point along the length. The seat support may be configured with two bends 174, 176 to locate the attachment strap at desired positions when the safety seat is installed in a vehicle. The bends may be located and configured to act as channels, such that when the attachment straps are tightened (i.e., during installation of the safety seat), the attachment straps will become located at or near the apex of the bend 174, 176. The seat support 180 may include a relatively smooth surface to permit sliding of the attachment strap 130 on the seat support and into a bend 174, 176 as the straps are tightened during installation. When the safety seat is installed in a vehicle in a forward-facing position, as shown in FIG. 3, the lower attachment straps 130 will move towards and into bend 176 as the attachment straps are tightened.

When the safety seat is installed in a rearward-facing position, as shown in FIG. 4, the lower attachment straps 130 will move towards and into bend 174 as the attachment straps are tightened. Desired attachment strap location may be a critical factor in occupant safety and mitigating adverse effects of an impact. Additionally, since the seat support 180 is unimpeded between the first bend 174 and the second bend 176, the attachment strap 130 may be moved between the forward-facing installation position and the rearward-facing installation position without removal of the attachment straps from the safety seat. This feature, together with strategically configured and located bends, may help to prevent common installation errors by a user.

Example embodiments of a safety seat according to the present invention may further include safety belt pathways 190, 192 through the seat portion 110 to facilitate securing the safety seat in a vehicle using the vehicle safety belt or an attachment belt that includes latch connectors on both ends. Referring to FIG. 3, safety belt pathway 190 includes two apertures, one on each side of the seat portion 110 proximate the seat bend 176, for insertion of a safety belt 195 through a first side of the seat portion 110 and out through the other side of the seat portion 110. The safety belt pathway 190 may be configured to accept a lap-belt only, a lap-belt and shoulder-belt doubled together, or an attachment belt with latch connectors at either end. When installed using a safety belt or attachment belt, the belt of the vehicle passes over the seat support 180 such that when the belt is fastened, the seat support 180 is secured to the vehicle. This configuration applies the tension of the safety belt or attachment belt to the seat support and may prevent applying significant tension or force to the seat portion 110 of the safety seat 100.

Similarly, with regard to FIG. 4, a safety belt pathway 192 for the rearward-facing position extends through the safety seat 110 proximate the second bends 174 for use when the safety seat is installed in the rear-facing position with a safety belt. As with the forward-facing safety belt installation, the safety belt 196 extends over the seat support 180 such that tension applied to the belt is exerted on the seat support 180 in addition to the seat portion 110.

Referring again to FIG. 2, the safety seat may include safety belt pathways 190 and 192 as described with respect to FIGS. 3 and 4. Between the apertures in the seat 110 that define each of the pathways 190, 192, seat-belt lock-offs (191, 193) may be used to secure the safety belt to the seat portion 110 and retain the safety belt in a desired location. The seat-belt lock-offs 191, 193 may be a two-piece configuration with the first piece being an integrally molded recesses in the seat portion 110. The second piece may be a locking portion that hingedly attaches to the integrally molded recess. In the open position, the safety belt may be placed across the recess. In the closed position, the safety belt is secured by the locking portion in the seat-belt lock-off 191, 193. The locking portion may securely snap in to the recess when in the closed position. The recess portions may optionally be separately molded and installed into the seat portion. The locking portions and/or the recess portions may be made of a different color material than the seat portion 110 to alert the user of their presence and to clearly differentiate the locking portions from the seating area 115. For example, the seat-belt lock-offs 191, 193 may be molded of a bright color or color that contrasts with the seat portion 110 to attract the attention of a user and indicate the significance of such a part.

Figure 5:
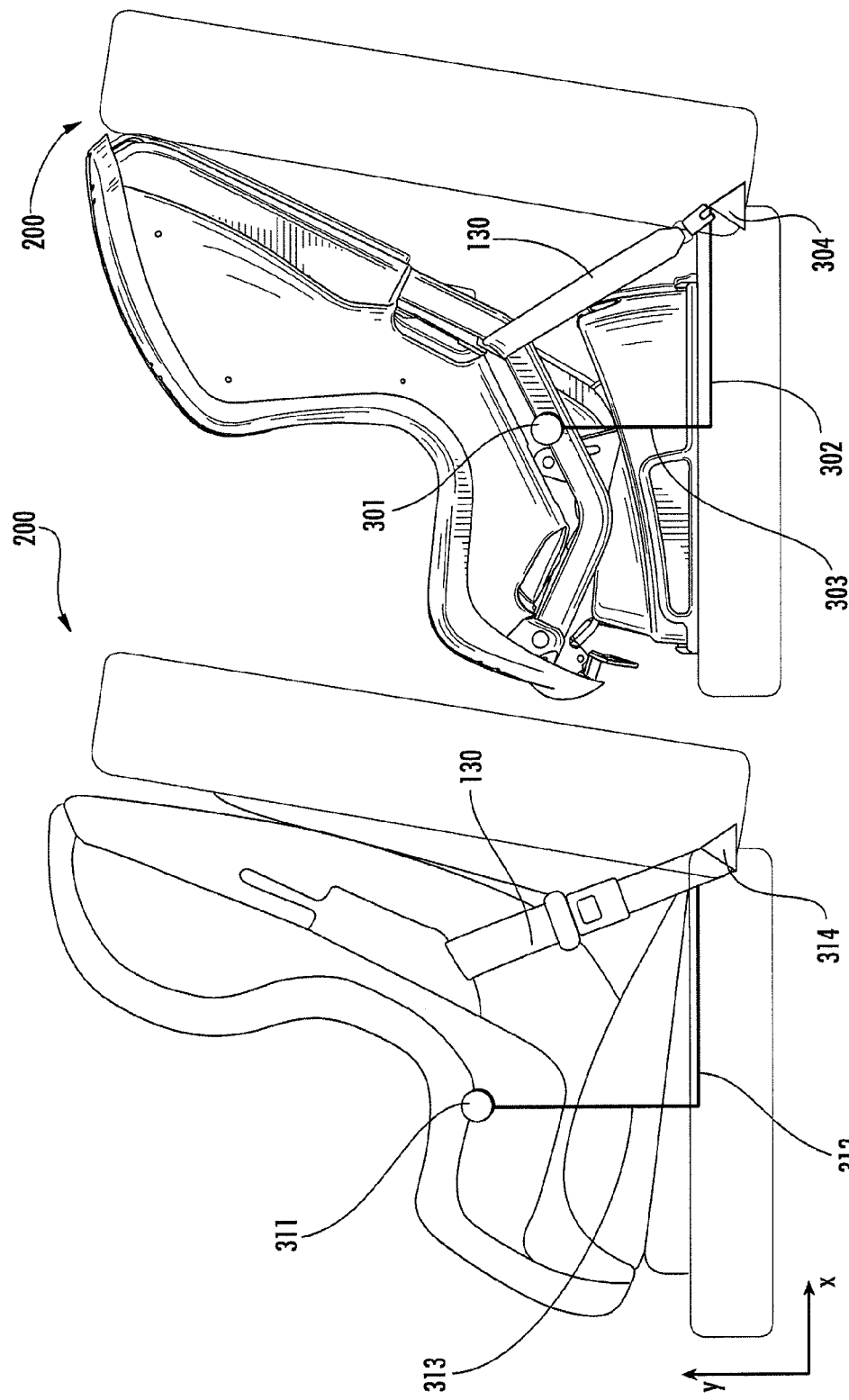
FIG. 5A is an illustration of the center of gravity of a child safety seat according to the state of the art.
FIG. 5B is an illustration of the center of gravity of a child safety seat according to an example embodiment of the present invention.

As previously noted in accordance with some embodiments of the present invention, the seat support 180 located adjacent to the seat portion 110 allows the bottom 117 of the seat portion to be configured in a lower position with respect to the base 120. Whether the safety seat is attached to the vehicle via the safety belt or the lower anchor attachment points, the safety seat 100 is substantially fixed at a point that is low on the seat, generally between the lower seat cushion 201 and the back seat cushion 202 (see FIG. 1). An example of the benefit of a lower center of gravity is illustrated in FIGS. 5A and 5B. The safety seats of FIGS. 5A and 5B are included only to provide visual references and are not intended to illustrate actual measurements. FIG. 5A illustrates a state-of-the art child safety seat that includes a higher center of gravity 311 whereas FIG. 5B illustrates a child safety seat according to an example embodiment of the present invention that includes a lower center of gravity 301. The X and Y coordinate moment arms of each embodiment (302, 303 and 312, 313) are from points 304 and 314 which are the relatively fixed attachment points of the safety seat to the vehicle. During a frontal impact, the center of gravity (301, 311) will tend to pivot about the substantially fixed point (304, 314), and as is particularly noticeable in the case of a forward-facing safety seat, the seat will tend to pitch forward. Lowering the center of gravity reduces the moment arm from the fixed point about which the safety seat will tend to rotate or pitch, thereby lowering the rotational force. Thus, a lower center of gravity will tend to pitch or rotate less than a higher center of gravity. This may help to reduce the head excursion (i.e. the distance an occupant's head travels) from the seat due to a frontal impact. This may also help to reduce the forces on an occupant of the seat in the event of an impact. While FIGS. 5A and 5B illustrate the child safety seat in a forward-facing position, the same geometry regarding the center of gravity and rotation about the fixed point holds true for the rearward-facing position.

Multiple features of embodiments of the safety seat of the present invention are configured to allow for and encourage the desired movements or kinematics of the seat to decrease impact forces experienced by an occupant of the seat as described further below. As noted above, during a frontal impact involving a forward-facing child safety seat, forward rotation of the child safety seat may cause head excursion of an occupant of the safety seat. As the forward rotation of the child safety seat is normally undesirable, it would be preferable for the bottom rear of the seat portion 110 to advance down and/or forward during a frontal impact to reduce rotation. The location of the attachment points 174, 176 on the safety seat 110 from which the attachment straps 130 extend may help to minimize or reduce the amount of forward rotation experienced by a safety seat 110 and an occupant during a frontal impact. Translating the forward rotational motion of a safety seat into a downward motion may benefit a safety seat occupant by reducing head excursion and altering the forces exerted on an occupant into a direction that is better tolerated by the body of an occupant, resulting in a lower likelihood of injury.

Figure 6:
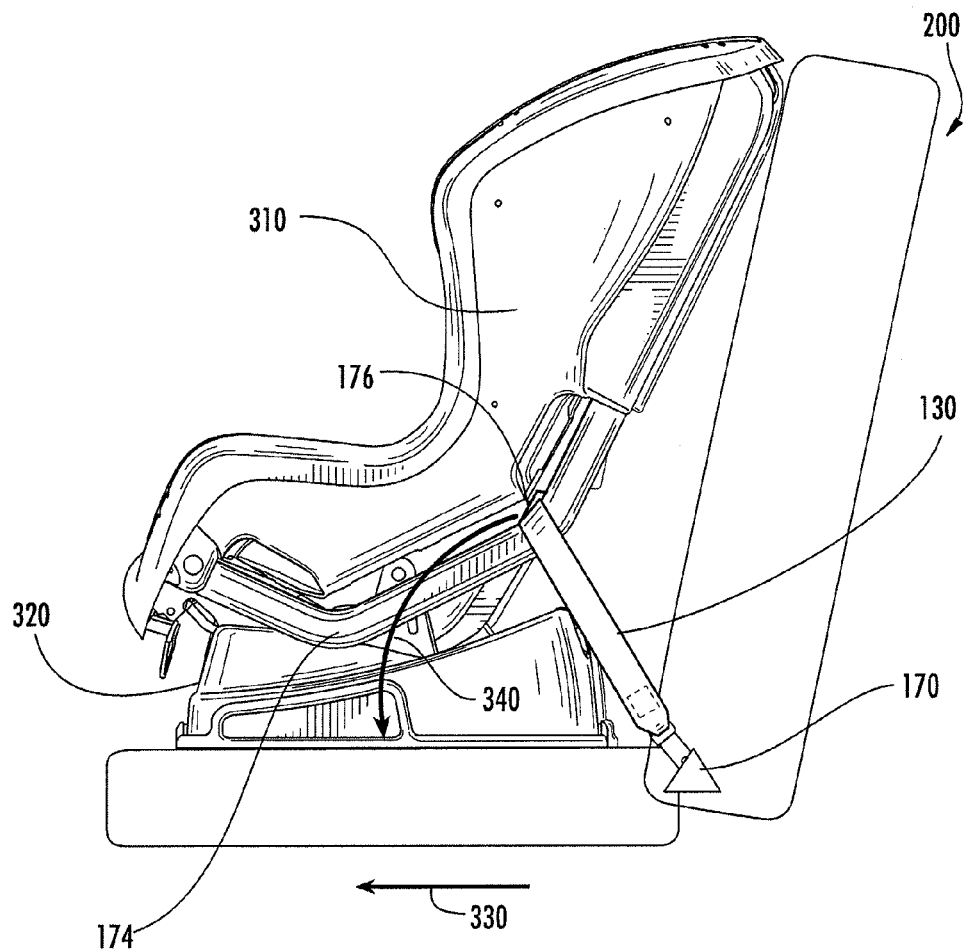
FIG. 6 is an illustration of a force of a typical frontal crash impact on a child safety seat in a forward-facing position according to an example embodiment of the present invention.

The location of the attachment straps 130 along the seat support 180 at the bends 174, 176 may encourage downward motion of the safety seat during a frontal impact, particularly when the seat is in a forward-facing position as illustrated in the example embodiment of FIG. 6. During a frontal impact, the safety seat would tend to travel forward (arrow 330) as the vehicle experiences abrupt deceleration. The length of the attachment strap 130 is fixed when installed in a vehicle. As the seat is urged forward by the impact, the attachment point 170, fixed within the vehicle, remains stationary relative to the vehicle. Thus, the attachment strap 130 is pulled forward in the direction of arrow 330. As the attachment strap is pulled forward, the strap may only travel along the radius defined by the fixed length of the strap and shown by arrow 340. Therefore, as the safety seat continues forward, the strap is urging the seat downward, along the radius defined by the length of the strap 340, thus urging the bottom of the seat 310 towards the base 320.

Figure 7:
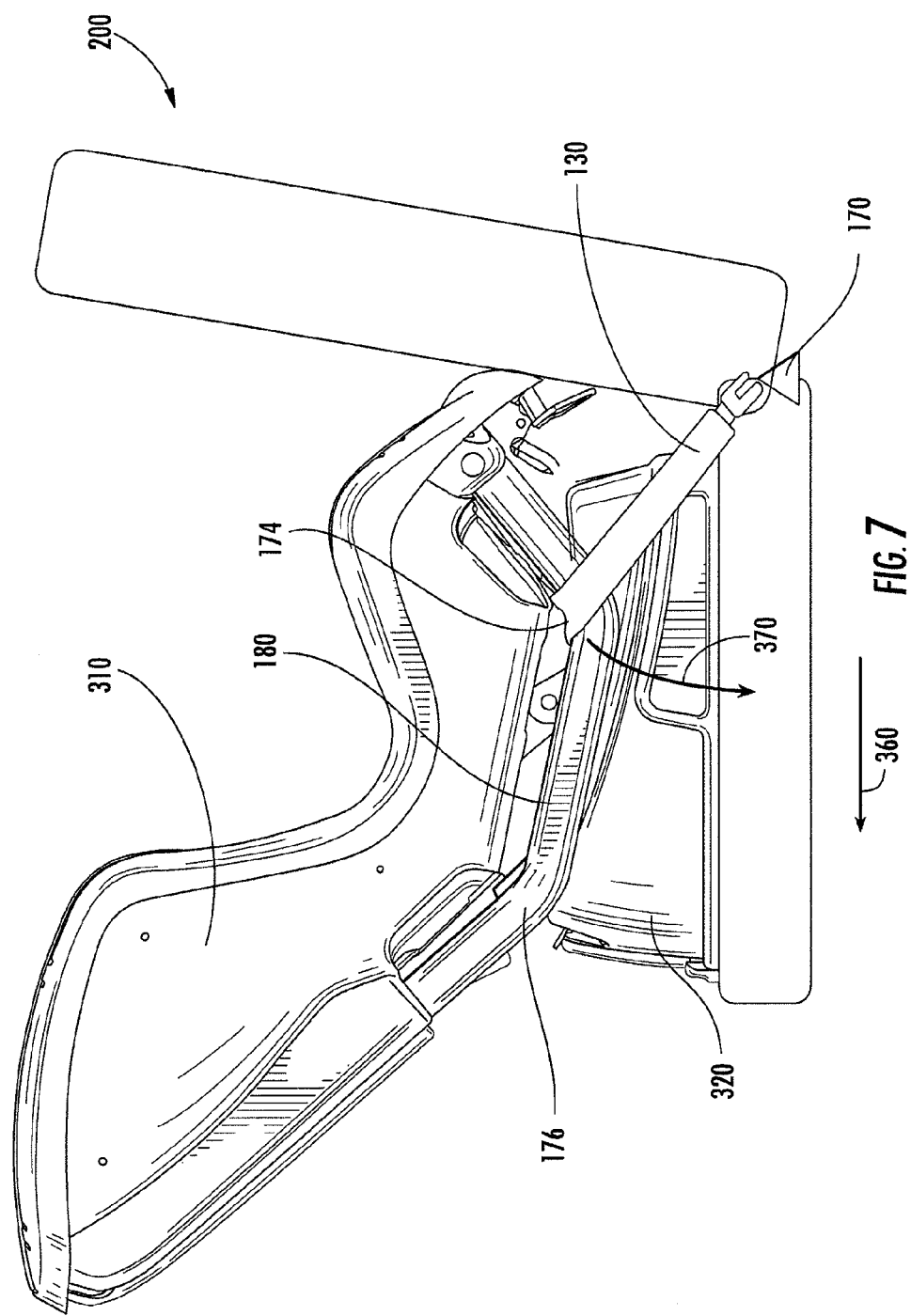
FIG. 7 is an illustration of a force of a typical frontal crash impact on a child safety seat in a rearward-facing position according to an example embodiment of the present invention.

FIG. 7 illustrates the forces involved in an example embodiment of the present invention in which the child safety seat is installed in a rearward-facing position. When installed in a rearward-facing position, the safety seat is typically more reclined with respect to the base or vehicle seat. If a safety seat in a rearward-facing position is subject to a frontal impact, the seat is urged forward by the impact along arrow 360 and the attachment point 170 remains stationary with respect to the vehicle. The motion of the seat 310 in the direction of arrow 360 results in the attachment strap being pulled forward and traveling along the radius defined by the length of the strap 130. Since the bend 174 that locates the point of attachment for the attachment strap 130 in the rearward-facing position is lower (with respect to the attachment point 170) than the bend 176 that locates the attachment strap 130 in the forward-facing position, the downward motion of the strap 130 generated by the frontal impact is less than in the forward-facing position. The resultant downward force of the seat 310 into the base 320 in a frontal impact for the rearward-facing safety seat is lower than the comparable force in the forward-facing position.

Figure 8:
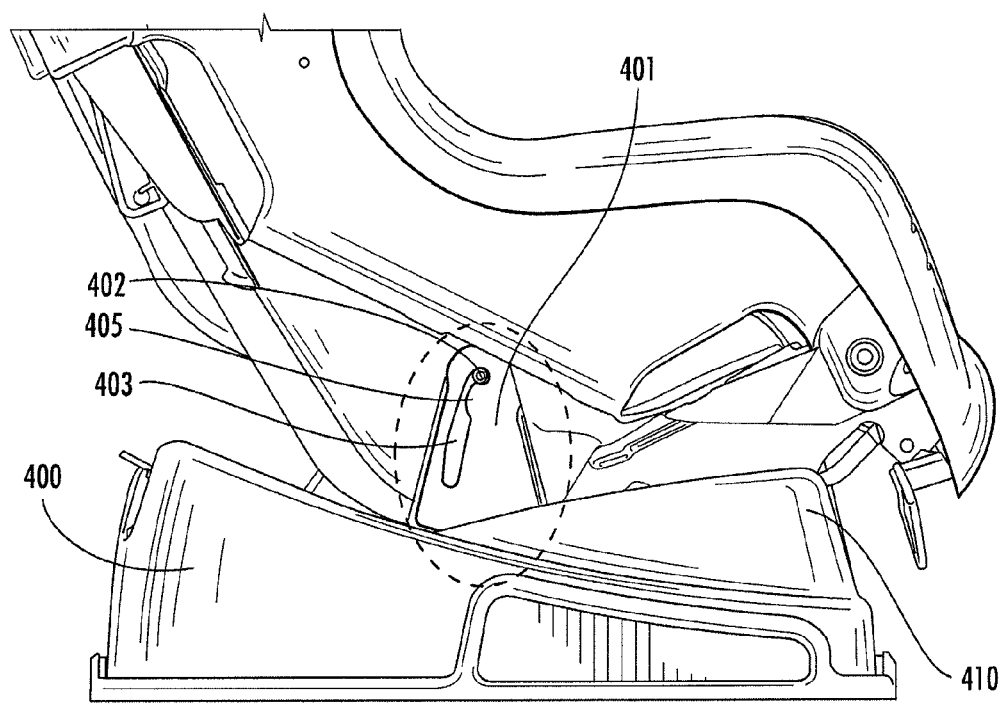
FIG. 8 is an illustration of the environment of a motion guide according to an example embodiment of the present invention.

FIG. 8 illustrates the side view of a safety seat illustrated without the seat support 180 according to an example embodiment of the present invention. The seat support 180 is omitted for ease of illustration and clarity of understanding features obstructed by the seat support 180. The base 400 of the illustrated embodiment includes a motion guide 401 which also functions as a crash indicator. The motion guide 401 is configured to guide the motion of the seat portion 420 when installed in a forward-facing position during a frontal impact and provide a visual indication to a user that the child safety seat has been involved in an impact and the performance or safety of the seat may be compromised.

Figure 9:
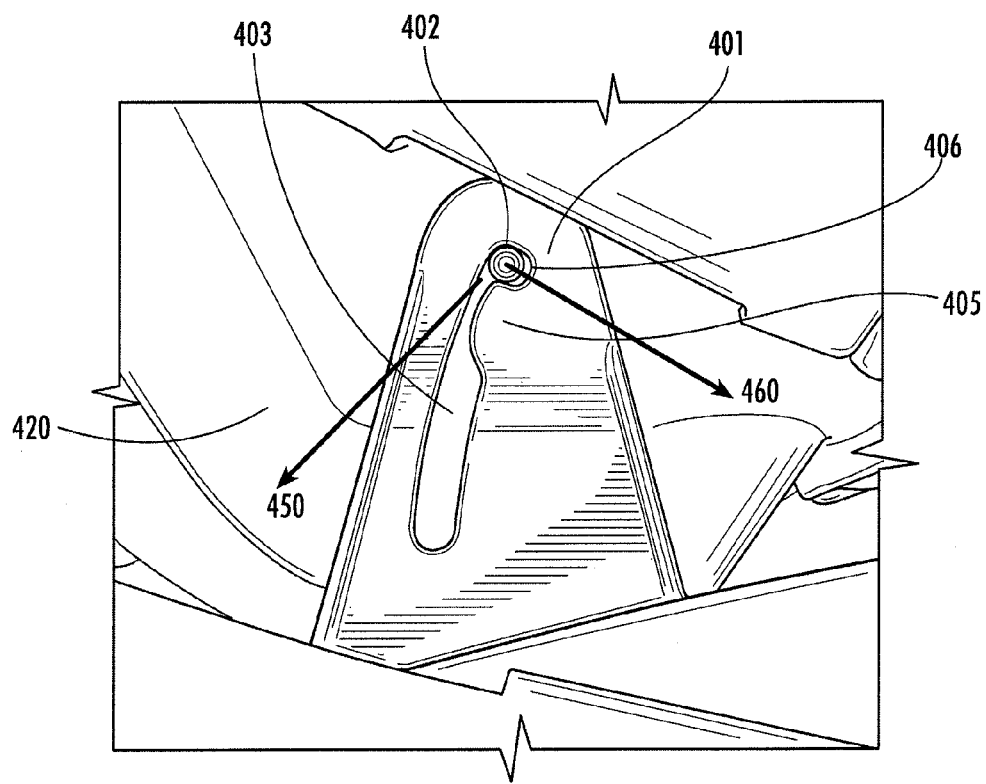
FIG. 9 is a detail view of the motion guide according to the example embodiment of the FIG. 8.

FIG. 9 illustrates a detail view of a motion guide 401 according to an example embodiment of the present invention. The motion guide 401 is configured to carry a pin 402 within a groove 403 of the motion guide 401. The pin 402 is attached to the seat portion 420 such that the pin 402 and seat portion 420 move in unison. The pin 402 is configured to rest upon a motion inhibitor or ridge 405 within the groove 403. Upon experiencing a frontal impact of sufficient force when the seat is in a forward-facing position, the pin 402 is urged past the ridge 405 and through the groove 403. While the illustrated embodiment shows the pin 402 coupled to the movement of the seat portion 420 while the motion guide 401 is fixed relative to the base 400, the converse may function equally well. The motion guide 401 may be coupled to the seat portion 420 while the pin 402 may be coupled to the base 400.

Figure 10:
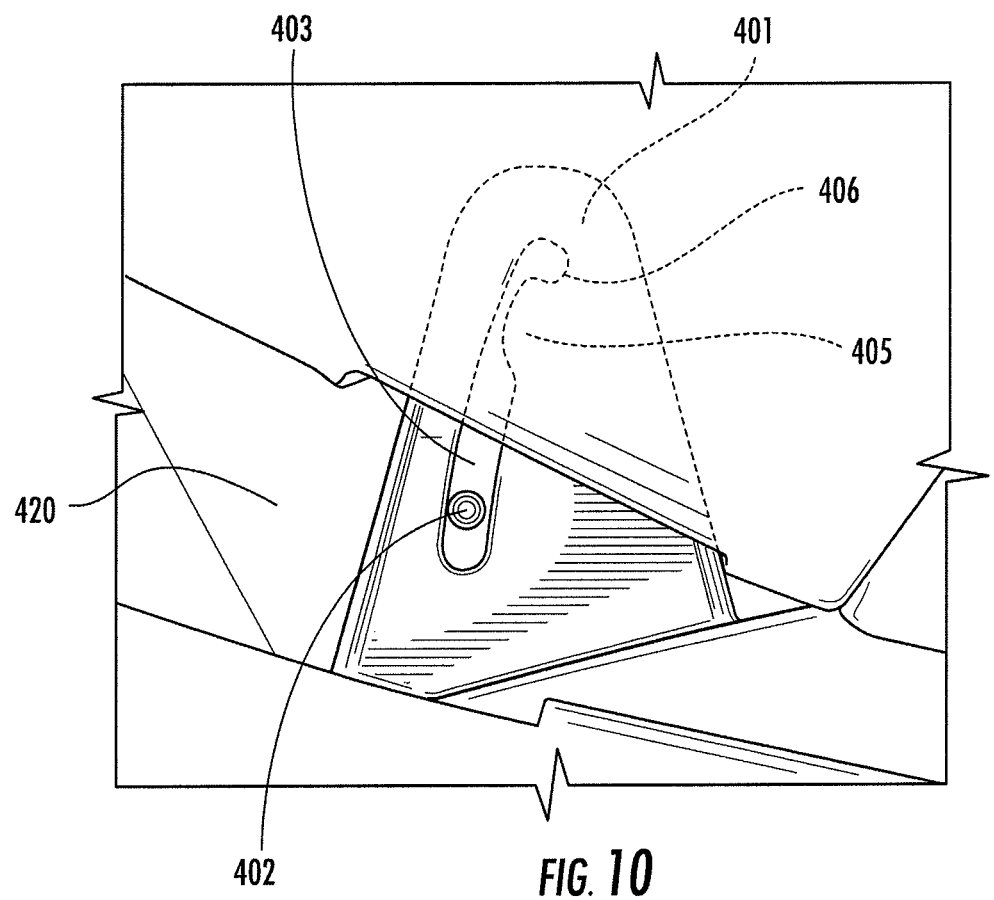
FIG. 10 is a detail view of the motion guide according to the example embodiment of FIG. 8 after experiencing a frontal impact.
Figure 11:
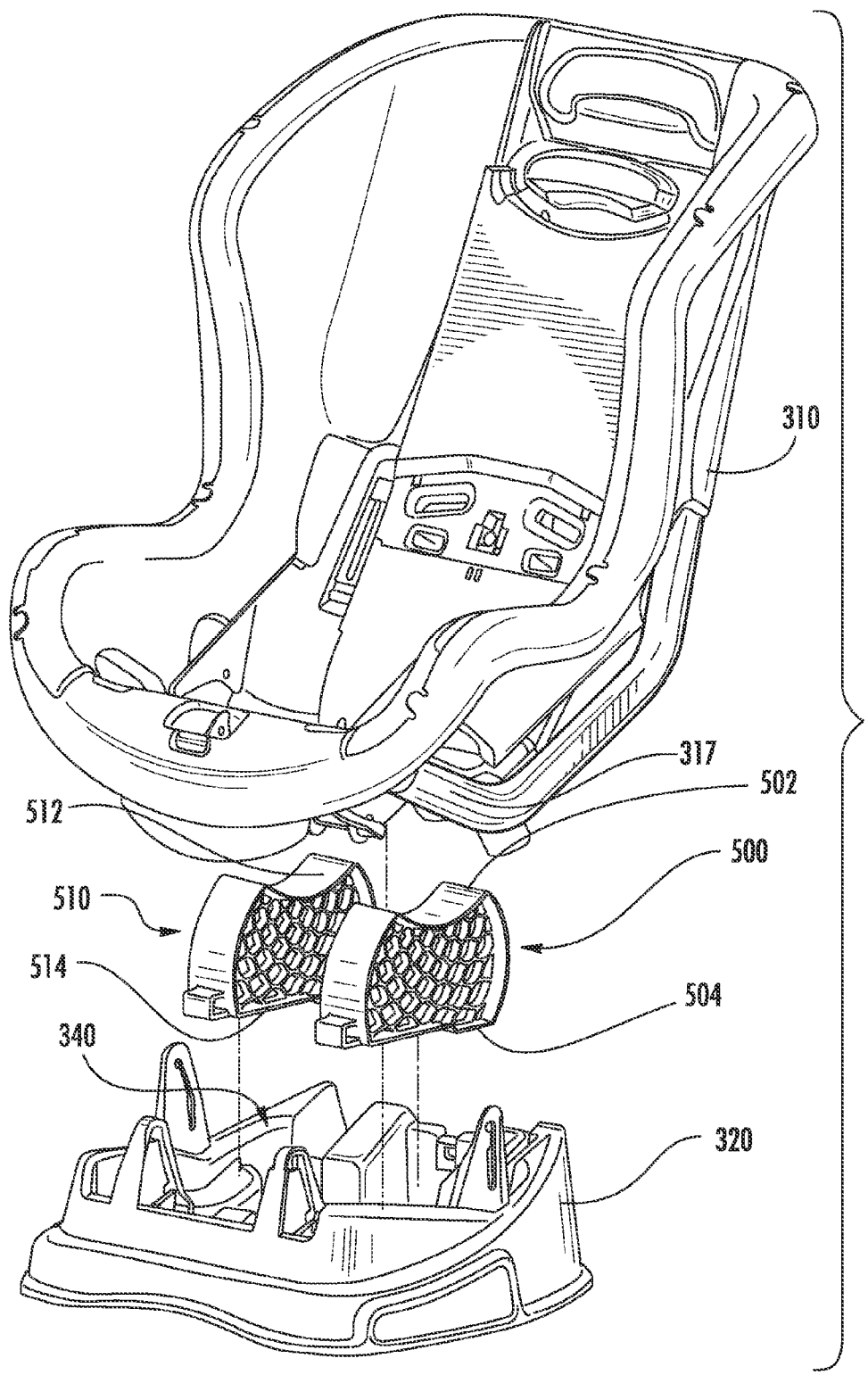

The motion guide 401 and the pin 402 may be visible from the side of the safety seat. The pin may be colored or include a cap made of metal or of another material or color that increases visibility of the pin when viewed from the side of the safety seat. This may allow a user to more easily view the location of the pin 402 within the motion guide 401. Once the safety seat has experienced a frontal impact in a forward-facing position sufficient to cause the pin 402 to pass over the ridge 405 and through the groove 403, the unseated position of the pin or cap within the groove 403 visibly indicates that the safety seat has experienced a significant impact as illustrated in FIG. 10. Once a safety seat has experienced a significant impact, the materials and attachment points may be weakened and compromise the future performance of the safety seat. The motion guide 401 may therefore provide a visual indication that the safety seat should no longer be used.

The direction of the force caused by a frontal impact when the child safety seat is in the forward-facing position may cause the pin 402 to travel towards the direction of the arrow 450 of FIG. 9 as the seat is caused to pivot about axis 410 as shown in FIG. 8. When the frontal impact causes the seat to experience a force above a predetermined threshold in the direction of arrow 450, the force causes the pin 402 to pass over the ridge 405 and through the groove 403. The ridge may help to prevent motion of the pin 402 into the groove 403 during an event, such as a hard braking event, that is unlikely to cause injury to an occupant of the vehicle. In such a hard braking event or mild "fender-bender" type impact, such as a frontal impact in which the vehicle airbags do not deploy, the force may be below the predetermined threshold and not be sufficient to cause the pin 402 to pass over the ridge 405. During a frontal impact causing sufficient force to dislodge the pin from the recess 406, the motion of the pin 402 at least partially through the groove 403 translates into the seat portion 110 pivoting around an axis 410 proximate the front of the base (shown in FIG. 8) and the seat bottom 117 moving down towards the vehicle seat bottom and towards or into the base 400. Axis 410 corresponds to a fixed forward position of the seat shell relative to the base, which may be adjusted if the seat shell is configured to recline, such as for a rear-ward facing position. The movement of the pin 402 at least partially through the groove 403, as illustrated in FIG. 10, translates at least a portion of the forward motion resulting from the impact into a downward motion into the safety seat base 400. During a frontal impact when the safety seat is installed in a forward-facing position, the motion guide 401, together with the appropriate location 176 of the attachment straps 130 along the seat support 180, encourage a downward motion of the seat into the base reducing the rotational motion of the seat and better protecting an occupant from injury.

Referring again to FIG. 9, the ridge 405 of the motion guide 401 may serve a separate purpose when the child safety seat is installed in a vehicle in the rearward-facing position as compared to the function in the forward-facing position described above. When the safety seat is installed in the rearward-facing position, a frontal impact may cause the pin to be forced deeper in to the recess 406 along the path of arrow 460 (as the seat portion is caused to pivot around axis 410). The kinematics of the seat 420 in the forward-facing position are different than the kinematics of the seat in the rearward-facing position such that motion of the pin 402 through the groove 403 may not be necessary, or may be undesirable for the performance of the safety seat. The shapes of recess 406 and ridge 403 are configured to retain the pin 402 along path 460, rather than allowing the pin 402 to move along groove 403.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A safety seat comprising:
   a seat shell including a bottom, a back, a first side, and a second side, wherein the seat shell is configured for an occupant of the safety seat to be situated between the first side and the second side, on the bottom, and against the back of the seat shell;

a first seat support configured to at least partially extend adjacent to the first side of the seat shell and at least a portion of the first seat support attaches to the back of the seat shell; and a second seat support configured to at least partially extend adjacent to the second side of the seat shell and at least a portion of the second seat support attaches to the back of the seat shell;

wherein the bottom is located between the first seat support and the second seat support, wherein the seat shell is configured with a first and a second aperture through the first side of the seat shell, and a third and fourth aperture through the second side of the seat shell, wherein the first aperture and third aperture of the seat shell are configured to receive a belt for securing the safety seat to a vehicle in a forward-facing position and, the second aperture and fourth aperture of the seat shell are configured to receive a belt for securing the safety seat to a vehicle in a rearward-facing position, wherein the first and second seat supports are arranged to be engaged by the belt passing through the first and third apertures when the safety seat is secured in a forward-facing position, and wherein the first and second seat supports are arranged to be engaged by the belt passing through the second and fourth apertures of the seat shell when the safety seat is secured in a rearward-facing position within the vehicle.

2. The safety seat according to claim 1, wherein the first seat support and the second seat support are identical parts.

3. The safety seat according to claim 1, wherein the first seat support and the second seat support extend at least partially adjacent the back of the seat shell and wherein separation between the first seat support and the second seat support decreases as the seat supports extend adjacent the back away from the bottom of the seat shell.

4. The safety seat according to claim 1, further comprising first and second attachment straps, wherein a first end of each of the first and second attachment straps is configured to be respectively attached to the first and second seat supports and wherein a second end of each of the first and second attachment straps is configured to be respectively attached to a first and second fixed location within a vehicle.

5. The safety seat according to claim 4, wherein the first and second portions are each configured with a first bend that defines a first desired location for attachment of the first end of each of the first and second attachment straps when the safety seat is installed in a vehicle in a rearward-facing position.

6. The safety seat according to claim 4, wherein the first and second seat supports are each configured with a first bend that defines a first desired location for attachment of the first end of each of the first and second attachment straps when the safety seat is installed in a vehicle in a forward-facing position.

7. The safety seat according to claim 6, wherein the first and second seat supports are each configured with a second bend that defines a second desired location for attachment of the first end of each of the first and second attachment straps when the safety seat is installed in the vehicle in a rearward-facing position.

8. The safety seat according to claim 6, wherein the first and second attachment straps are configured to each be shortened to secure the safety seat within the vehicle, and wherein the first and second attachment straps are configured to each be drawn towards and into the first bend in each of the first and second seat supports when the first and second attachment straps are shortened.

9. The safety seat according to claim 1, wherein the seat shell is configured to be pivotally attached to a base.

10. The safety seat according to claim 1, wherein at least a portion of the bottom is below the first and second seat supports when the safety seat is installed in a vehicle.

11. The safety seat according to claim 1, wherein the first and second seat supports are configured to be substantially enclosed by the seat shell along a portion of their length.

12. A safety seat, comprising:
a seat support including a first portion and a second portion;
a seat shell including a bottom, a back, a first side, and a second side, wherein the seat shell is configured for an occupant of the safety seat to be situated between the first side and the second side, on the bottom, and against the back of the seat shell; and
a seat cavity defined by the seat shell, wherein at least a portion of the seat cavity is disposed between the first portion and the second portion of the seat support and wherein at least a portion of the seat support attaches to the back of the seat shell
wherein the seat shell is configured with a first aperture and a second aperture through the first side of the seat shell, and a third aperture and a fourth aperture through the second side of the seat shell, wherein the first aperture and the third aperture are configured to receive a belt for securing the safety seat to a vehicle in a forward-facing position and a the second aperture and the fourth aperture are configured to receive a belt for securing the safety seat to a vehicle in a rearward-facing position, and
wherein the first portion and the second portion of the seat support are arranged to be engaged by the belt passing through the first and third apertures when the safety seat is secured in a forward-facing position, and
wherein the first portion and the second portion of the seat support are arranged to be engaged by the belt passing through the second and fourth apertures of the seat shell when the safety seat is secured in a rearward-facing position within the vehicle.

13. The safety seat of claim 12, wherein the seat support also includes an intermediate portion that extends across the back of the seat shell.

14. The safety seat of claim 12, wherein the seat support is configured to be attached to first and second fixed locations within a vehicle by first and second attachment straps.

15. The safety seat of claim 12, wherein the first portion and the second portion of the seat support each define at least one bend from which first and second attachment straps respectively extend when the safety seat is installed in a vehicle.

16. The safety seat according to claim 15, wherein the first portion and the second portion of the seat support each define a first bend and a second bend, wherein the first and second attachment straps extend from the first bend when the safety seat is installed in a vehicle in a forward-facing position and wherein the first and second attachment straps extend from the second bend when the safety seat is installed in a vehicle in a rearward-facing position.

17. The safety seat of claim 12, wherein the seat cavity extends at least partially below the seat support when the safety seat is installed within a vehicle.

18. The safety seat of claim 12, wherein the safety seat further comprises a base pivotally coupled to the seat shell and wherein the interface between the seat shell and the base is at least partially located between the first portion and the second portion of the seat support.

19. A safety seat comprising:

a seat shell for holding an occupant and including a back;

a support means for supporting the seat shell including a first portion and a second portion, wherein the first portion and the second portion are identical, and wherein the first portion and the second portion each define a first bend and a second bend; and a first attachment strap and a second attachment strap, each of the first attachment strap and the second attachment strap defining a first end for attachment to a respective one of the first portion and the second portion, and a second end for attachment to a vehicle, wherein at least a portion of the seat shell is disposed between the first portion and the second portion of the support means, wherein at least a portion of each of the first portion and second portion of the seat support means attaches to the back of the seat shell; and wherein the first bend of each of the first portion and the second portion defines a position of the first end of each of the first and second attachment straps when the safety seat is installed in a vehicle in a forward-facing position, and wherein the second bend of each of the first portion and the second portion defines a position of a first end of each of the first and second attachment straps when the safety seat is installed in a vehicle in a rearward-facing position.

\* \* \* \* \*

UNITED STATES PATENT AND TRADEMARK OFFICE
CERTIFICATE OF CORRECTION

PATENT NO. : 8,905,478 B2  
APPLICATION NO. : 12/725968  
DATED : December 9, 2014  
INVENTOR(S) : L. Curtis Strong Page 1 of 1

It is certified that error appears in the above-identified patent and that said Letters Patent is hereby corrected as shown below:

In the Claims

Column 12, Claim 12, Line 31 "position and a the second aperture and the fourth aper-" should read --position and the second aperture and the fourth aper- --.

Signed and Sealed this  
Twenty-sixth Day of May, 2015

Michelle K. Lee  
*Director of the United States Patent and Trademark Office*